United States Patent [19]
Ueda

[11] Patent Number: 6,044,072
[45] Date of Patent: Mar. 28, 2000

[54] CDMA COMMUNICATION SYSTEM HAVING MEANS FOR CONTROLLING ACCESS IN DEPENDENCE ON COMMUNICATION QUALITY

[75] Inventor: Tetsuro Ueda, Tokyo, Japan

[73] Assignee: NEC Corporation, Tokyo, Japan

[21] Appl. No.: 08/878,776

[22] Filed: Jun. 19, 1997

[30] Foreign Application Priority Data

Jun. 20, 1996 [JP] Japan .................................. 8-160309

[51] Int. Cl.[7] .............................. H04B 7/216; H04J 13/02
[52] U.S. Cl. .......................... 370/335; 370/342; 370/441; 455/422; 455/453; 455/522
[58] Field of Search .................... 370/335, 342, 370/441; 455/422, 522, 67.1, 453; 375/200

[56] References Cited

U.S. PATENT DOCUMENTS

| | | | |
|---|---|---|---|
| 5,245,629 | 9/1993 | Hall | 375/200 |
| 5,475,861 | 12/1995 | Hall | 455/422 |
| 5,623,484 | 4/1997 | Muszynski | 370/335 |
| 5,734,646 | 3/1998 | I et al. | 370/335 |
| 5,857,147 | 1/1999 | Gardner et al. | 455/67.1 |
| 5,884,187 | 3/1999 | Ziv et al. | 455/522 |

FOREIGN PATENT DOCUMENTS

| | | |
|---|---|---|
| 0 652 680 | 5/1995 | European Pat. Off. . |
| 63-50219 | 3/1988 | Japan . |
| 2-220526 | 9/1990 | Japan . |
| 5-145516 | 6/1993 | Japan . |
| 7-95124 | 4/1995 | Japan . |
| 8-191481 | 7/1996 | Japan . |
| 94/27384 | 11/1994 | WIPO . |
| 95/07578 | 3/1995 | WIPO . |
| 96/12380 | 4/1996 | WIPO . |

*Primary Examiner*—Alpus H. Hsu
*Assistant Examiner*—John Pezzlo
*Attorney, Agent, or Firm*—Sughrue, Mion, Zinn Macpeak & Seas, PLLC

[57] ABSTRACT

In order to control access from mobile terminals in a code division multi-access communication system, a terminal communicating with one of base station measures data relating to quality of a downlink signal during a predetermined time interval to inform the base station of downlink signal quality. The base station also measures data relating to quality of an uplink signal during the predetermined time interval to produce uplink signal quality data. A base station control device determines from the downlink signal quality data and the uplink signal quality data, communication quality within the the service zone of the base station, and sends an access confinement signal to the base station when the communication quality is determined to be bad. Thus, the base station processes now incoming calls to and from other mobile radio terminals as busy.

11 Claims, 2 Drawing Sheets

CDMA COMMUNICATION SYSTEM HAVING MEANS FOR CONTROLLING ACCESS IN DEPENDENCE ON COMMUNICATION QUALITY

BACKGROUND OF THE INVENTION

This invention relates to a code division multiple access (CDMA) communication system and, in particular, to confinement of access from mobile terminals in such CDMA communication system.

A known CDMA communication system comprises a plurality of mobile radio terminals, a plurality of base stations having different radio service zones, and a base station control device. In a communication system, a particular one of the plurality of mobile radio terminals communicates with a particular one of the plurality of base stations having a particular one of the radio service zones in which the particular mobile radio terminal currently exists.

As is known in the art, the CDMA communication system uses a spread spectrum technique wherein a carrier signal is spectrum is spread, on a transmitting side, by use of a pseudo-noise (PN) code and is subsequently transmitted. On the receiving side, the transmitted signal is received as a received signal, which is, in turn, correlated with the PN code signal to derive the carrier signal from the received signal. In the CDMA communication system using the spread spectrum technique, many channels can be made by use of different PN codes, without use of different carrier frequencies, and can be protected from cross talk between each other as well as signal interception.

However, the CDMA communication system has graceful degradation, that is, that the communication quality degrades as the communication traffic or the number of calls increases. This means that a data communication requiring a high communication quality cannot be completed when the traffic increases excessively during the communication.

In order to resolve the problem of graceful degradation in the CDMA communication, JPA 5-145516 discloses provision of a memory for storing attributes of terminals accommodated in the system and maximum traffic values acceptable for attributes of the terminals to thereby control access of terminals to maintain the traffic by the terminals below the maximum traffic values.

According to the resolve by resolution of JPA 5-145516, it is undesirably required before using the system, to actually measure the radio transmission for various attributes of the terminals, such as telephone terminals, facsimile terminals, data transmission terminals and others within each of the radio service zones so as to determine the acceptable maximum traffic values.

Further, since the accessible maximum traffic values are fixedly determined for each of the attributes of the terminals, it is often impossible to efficiently use the frequency. This is because the accessible traffic values are dependent on traffic values and radio transmission conditions which always vary.

SUMMARY OF THE INVENTION

Therefore, it is an object of this invention to provide a method for controlling access of terminals to a service zone of a base station in a CDMA communication system by currently monitoring the communication quality in the radio service zone without predetermining the maximum traffic values for attributes of the terminals, so as to maintain the high communication quality with the high efficiency in the use of the frequency.

It is another object of this invention to provide another method for controlling the access of terminals to the base station in the CDMA communication system based on the maximum number of calls which, in turn, can be adjusted depending on the current communication quality as monitored.

It is another object of this invention to provide a CDMA communication system which can carry out the access control method meeting the objects as mentioned above.

According to this invention, there is an access controlling method in a code division multi-access communication system comprising a plurality of mobile radio terminals, a plurality of base stations having different radio service zones, and a base station control device, and a particular one of the plurality of mobile radio terminals communicating with a particular one of the plurality of base stations having a particular one of the radio service zones in which the particular mobile radio terminal currently exists. The method comprises steps of: the particular mobile radio terminals receiving a downlink signal transmitted from the particular base station, and measuring data relating to quality of the downlink signal during a predetermined time interval to transmit as downlink signal quality data to the particular base station; the particular base station receiving an uplink signal transmitted from the particular mobile radio terminals, and measuring data relating to quality of the uplink signal during the predetermined time interval to produce uplink signal quality data, the particular base station communicating the downlink signal quality data and the uplink signal quality data to the base station control device; the base station control device determining, from the downlink signal quality data and the uplink signal quality data, communication quality within the particular radio service zone, the base station control device sending an access confinement signal to the particular base station when the communication quality is determined to be bad; and the particular base station responding to the access confinement signal by processing a fresh call to and from one of the mobile radio terminals as busy.

Further, this invention is applicable to a code division multi-access communication system comprising: a plurality of mobile radio terminals, a plurality of base stations having different radio service zones, and a base station control device; each one of the plurality of mobile radio terminals communicating, as a particular mobile radio terminal, with a particular one of the plurality of base stations having a particular one of the radio service zones in which the each one of the mobile radio terminals currently exists. According to this invention, the code division multi-access communication system comprises; each of the mobile radio terminals further comprising; means for receiving a downlink signal transmitted from the particular base station, and means for measuring data relating to quality of the downlink signal during a predetermined time interval to transmit as downlink signal quality data to the particular base station; each of the base stations further comprising, means for receiving an uplink signal transmitted from the particular mobile station, and means for measuring data relating to quality of the uplink signal during the predetermined time interval to produce uplink signal quality data, the particular base station communicating the downlink signal quality data and the uplink signal quality data to the base station control device; and the base station control device comprising: means for defining, from the downlink signal quality data and the uplink signal quality data from the particular base station, communication quality within the particular radio service zone in order to send an access confinement signal to the particular base station when the communication quality is determined to be bad, whereby the particular base station responds to the access confinement signal by processing for a fresh call from one of the mobile radio terminals as busy.

DESCRIPTION OF PREFERRED EMBODIMENTS

Figure 1:
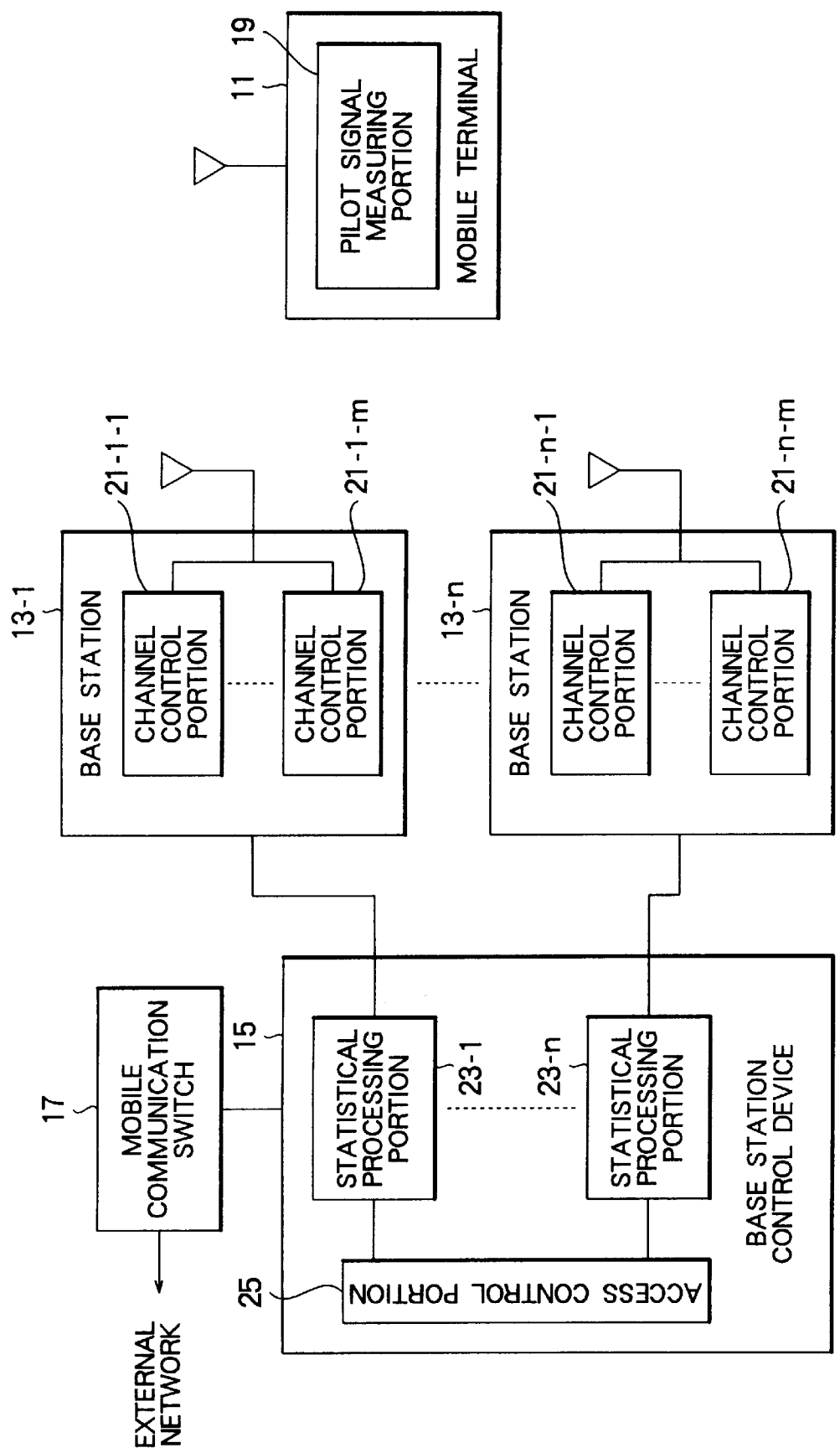
FIG. 1 is a schematic diagram view of a CDMA communication system according to an embodiment of this invention.

Referring to FIG. 1, there is shown a block diagram of a digital mobile communication system using the CDMA system according to an embodiment of this invention.

The digital communication system shown therein comprises mobile radio terminals 11 (only one of them is shown), base stations 13-1 through 13-n (n is a natural number equal to 2 or more, collectively identified as 13), a base station control device 15, and a mobile communication switch 17. Each of the mobile stations 11 communicates with the nearest one (13-k) of the base stations 13-n. Each of the mobile stations 11 has a pilot signal measuring portion 19. Each of the base stations 13-1 through 13-n is provided with a plurality of (m a natural number equal to 2 or more) channel control portions 21-n-1 though 21-n-m (collectively identified as 21) which respectively correspond to calls. The base station control device 15 is provided with a plurality of (n) statistical processing portions 23-1-1 through 23-1-n (collectively identified as 23) which correspond to the base stations 13-1 through 13-n, respectively, and an access control portion 25.

The statistical processing portions 23 and the access control portion 25 in the base station control device 15 function as a quality defining means for instructing access confinement to the base stations 13 including those currently communicating in dependence on the communication quality. Therefore, it is unnecessary to predetermine acceptable traffic values for the base stations 13, respectively. The access control or confinement can be performed in dependence on the traffic distribution condition for each of the base stations 13, so that the desired communication quality can always be insured with high efficiency in use of the given frequency band.

Upon receipt of the channel confinement instruction, the channel control portions 21 process an incoming call to or from the other mobile radio terminals 11 as busy.

According to another embodiment, the channel control portions 21 in the base stations 13 further control the access confinement for all of the channels in dependence on the maximum call number stored in a memory (not shown). The maximum call number is adjusted in response to the communication quality conditions, as described below. Therefore, even if a number of calls occur during a short period, it is possible, by adapting the current traffic distribution, to maintain the desired communication quality.

Figure 2:
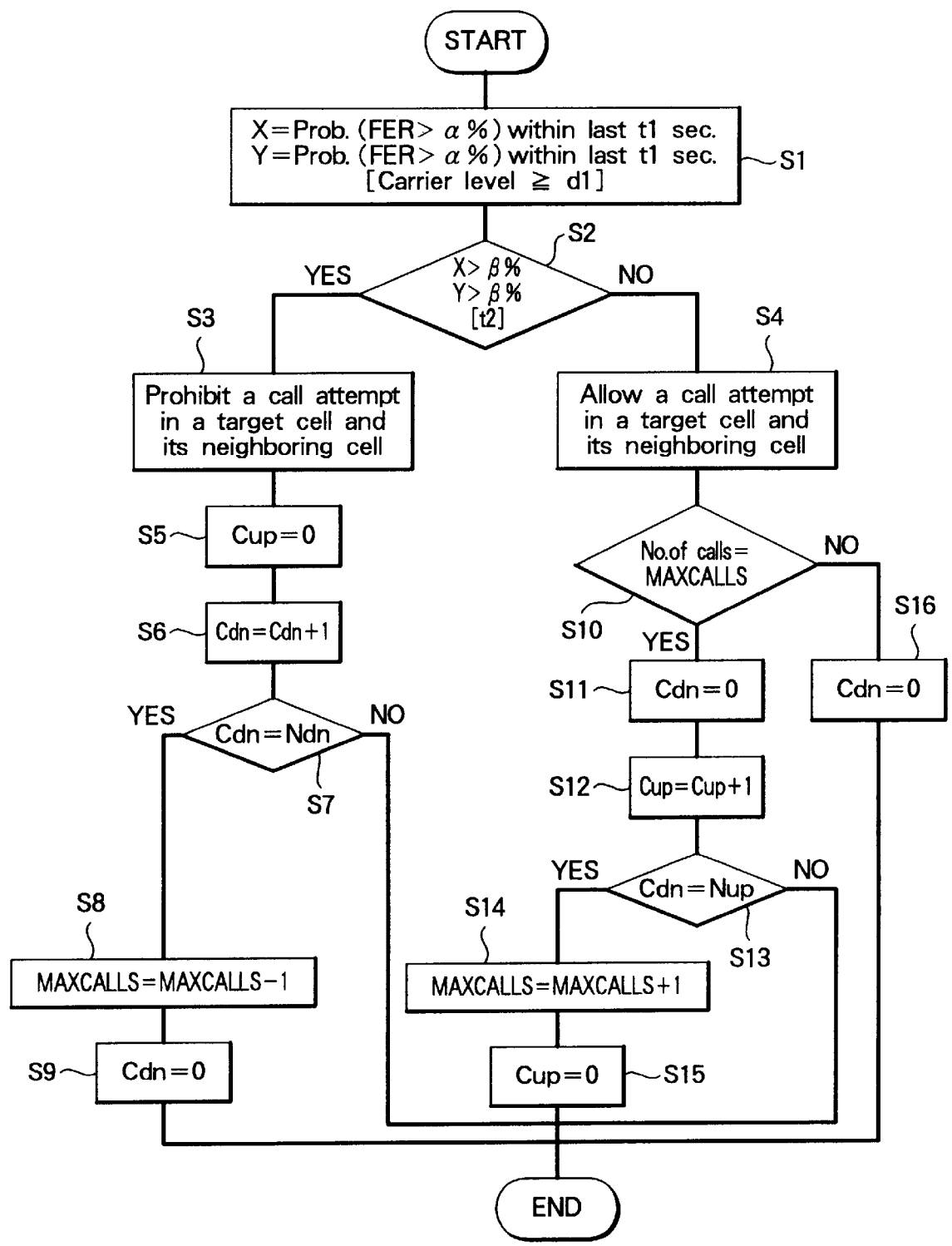
FIG. 2 is a chart illustrating an access control operation flow of the system in FIG. 1.

Referring to FIG. 2, there is shown a flow chart illustrating an example of a access control sequence in a digital mobile communication system using the CDMA system as shown in FIG. 1.

Referring to FIGS. 1 and 2, description will be made in regard to an example of the access control in the digital mobile communication system using the CDMA system according to an embodiment of this invention, below.

During communication, the mobile station 11 measures the pilot signal which is always transmitted from the base stations 13. For example, measurement occurs in a unit of a measuring frame corresponding to a unit time t1 (for example a measuring frame of 2 seconds) transmitted from the base station control device 15, with each of 100 unit frames within each frame being 20 msec. The mobile station reports to the base station 13 data of the average reception signal level and the number of error frames in a downward (received) signal transmitted from the base station 13. The measuring frame information can be sent to all of mobile stations 11 through the base stations 13 as broadcast information before the start of any call.

When the average received signal level cannot be measured after, for example, the received signal is gain controlled, an average relative value of a received signal level to noise and interference which is determined by $Eb/(N0+I0)$ can be used in place of the average received signal level, where Eb is a received energy per bit of the pilot signal, and $(N0+I0)$ is an entire spectral density of the noise and interference as received.

In one of the communicating base stations 13, one of the channel control portions 21, corresponding to each of the mobile stations 11 and each of the channels, measures the number of error frames in an upward signal transmitted from the corresponding mobile station at a rate indicated by the base station control device 15, for example, at a rate of 100 units per frame, and calculates the frame error rate (FER) in the upward signal.

At the rate indicated by the base station control device 15, each of the channel control portions 21 reports to each of the statistic processing portions 23 the FER of the upward signal, and the average received signal level (or the average relative value $Eb/(N0+I0)$) and the number of error frames in the downward signal.

The base station control device 15 calculates the FER of the downward signal from the downward number of error frames and the measuring frame rate. Then, the base station control device 15 compares a predetermined value α% with the FER calculated to produce a first probability x (=Prob. (FER>α%)) that the downward signal FER exceeds the predetermined value α%, and also compares the predetermined value α% with each of a set of the FER of the upward signal to produce a second probability y (=Prob. (FER>α%)) that the upward signal FER exceeds α%, as shown at step S1 in FIG. 2. Then, the base station control device 15 compares the probabilities x and y with another predetermined value β% at step S2, and generates an access confinement signal as shown at step S3 when both a probability x and y are larger than β%. On the other hand, when either or both of the probabilities x and y are not larger than β% at step S2, the base station control device 15 generates the acceptance signal as shown at step S4.

The access confinement (or acceptance) signal is then applied to the corresponding base station 13 and adjacent base stations. Upon reception of the access confinement signal, each of the base stations processors new calls as busy.

Each of the base stations 13 further monitors a maximum number of calls and a current number of calls between the base station 13 and the mobile terminals, as described above. When the the current number of calls becomes the maximum number of calls, each of the base stations processes new calls, either incoming or outgoing, as busy, in no relation to whether or not both of the probabilities x and y are larger then β%. Thus, degradation communication quality can be avoided even if there are many calls in quite a short time before determining whether or not both of the probabilities x and y are larger then β%. The maximum number of calls can be adjusted by the statistical processing portions 23 in the base station control device 15 through steps S5–S9 and S10–S16 in FIG. 2, during a steady time period when many calls do not occur in quite a short time.

At steps S5–S10 in FIG. 2, Cup and Cdn represent a number of calls currently accepted and a number of calls currently rejected, respectively. Nup and Ndn represent the maximum numbers (for example, both being 5) of Cup and Cdn, respectively. MAXCALLS represents the maximum number of calls.

In the steady condition of the call occurrence, Cup is set "0" at step S5 after step S3, and Cdn is increased by "1" at step S6. Then, Cdn and Ndn are compared at step S7. If Cdn does not reach Ndn, MAXCALLS is maintained without change. If Cdn reaches Ndn, MAXCALLS is decreased by "1" at step S8, and then Cdn is set "0" at step S9. While, after the new call is accepted at step S4, the number of calls which are now accepted or communicating is compared with MAXCALLS at step S10. When they are equal to each other, Cdn is set "0" at step S11, and then Cup is increased by "1" at step S12. Then, Cup is compared with Nup at step S13, when Cup does not reach Nup, the MAXCALLS is maintained without change. When Cup is equal to Nup, MAXCALLS is increased by "1" at step S14 and then Cup is set "0" at step S15. When the number of calls is equal to MAXCALLS at step 10, Cdn is set "0" at step S16.

If the MAXCALLS is set "1" when the system starts, MAXCALLS is adjusted at the steady condition by the operation through steps S5–S16.

The MAXIMCALLS adjustment is sent from the base station control device 15 to the base stations 13 in which the MAXCALLS value is renewed.

As an example of the above embodiment, α and β may be 1 and 5, respectively. Further, α can be different for different attributes of the mobile radio terminals. For example, α is determined as 1 and 0.1 for an audio terminal and a data terminal.

What is claimed is:

1. An access controlling method in a code division multi-access communication system which comprises a plurality of mobile radio terminals, a plurality of base stations having different radio service zones, and a base station control device, in which a particular one of said plurality of mobile radio terminals communicates with a particular one of said plurality of base stations having a particular one of said radio service zones in which said particular mobile radio terminal currently exists, said method comprising the steps of:

said particular mobile radio terminal receiving a downlink signal transmitted from said particular base station, measuring data relating to quality of the downlink signal during a predetermined time interval, and transmitting the measured data as downlink signal quality data to said particular base station;

said particular base station receiving an uplink signal transmitted from said particular mobile station, measuring data relating to quality of the uplink signal during said predetermined time interval, and producing uplink signal quality data;

said particular base station sending said downlink signal quality data and said uplink signal quality data to said base station control device;

said base station control device determining, from said downlink signal quality data and said uplink signal quality data, communication quality within said particular radio service zone;

said base station control device sending an access confinement signal to said particular base station when said communication quality is determined by said base station control device to be bad; and said particular base station responding to said access confinement signal by processing new calls, to and from one of said mobile radio terminals and said particular base station, as busy.

2. The method as claimed in claim 1, wherein said base station control device further transmits said access confinement signal to specific base stations which have radio service zones adjacent to said particular radio service zone; and each of said specific base stations responds to said access confinement signal by processing new calls, to and from one of said mobile radio terminals and said specific base station, as busy.

3. The method as claimed in claim 1, said particular base station transmitting a spread spectrum pilot signal, said particular mobile radio terminal receiving said spread spectrum pilot signal as a received signal and demodulating said received signal into a demodulated pilot signal, whereby said downlink signal quality data is measured and comprises an average received signal level of said received signal during said predetermined time interval and a number of error frames occurring in said demodulated pilot signal.

4. The method as claimed in claim 3, wherein an average relative value of a received signal level to noise and interference, determined by $Eb/(N0+I0)$, is used in place of said average received signal level of said received signal, Eb being a received signal energy per one bit of said pilot signal and $(N0+I0)$ being an entire spectral density of said noise and interference as received.

5. The method as claimed in claim 3, said uplink signal having subsequent frames, wherein said uplink signal quality data comprises an uplink signal frame error rate occurring in said uplink signal as received at said particular base station during said predetermined time interval.

6. The method as claimed in claim 5, wherein said base station control device determines said communication quality by:

calculating a downlink signal frame error rate from said number of error frames and said predetermined time interval;

comparing said first predetermined value with each of a set of downlink signal frame error rates obtained during a predetermined time period longer than said predetermined time internal to produce a first probability that the downlink signal frame error rate exceeds said first predetermined value;

comparing a second predetermined value with each of a set of uplink signal frame error rates obtained during a predetermined time period longer than said predetermined time interval to produce a second probability that the uplink signal frame error rate exceeds said second predetermined value; and comparing said first and said second probability with a third predetermined value;

said base station control device generating said access confinement signal when said first and said second probability are both larger than said third predetermined value.

7. The method as claimed in claim 6, wherein said particular base station:

memorizes, as a current call number, a number of calls which are currently established at said particular base station; and stores a maximum number of calls which can be allowed at said particular base station;

said particular base station comparing said current call number with said maximum number of calls without reference to whether or not said first and said second probability are both larger than said third predetermined value; and processing new calls therefrom and thereto as busy when said current call number equals the maximum number of calls.

8. The method as claimed in claim 6, wherein a value representing said maximum number of calls:

is adjusted at said base station control device during a steady state condition when many calls do not occur during a short time period; and is also renewed at the particular base station.

9. A code division multi-access communication system comprising: a plurality of mobile radio terminals; a plurality of base stations having different radio service zones; and a base station control device;

in which each one of said plurality of mobile radio terminals communicates, as a particular mobile radio terminal, with a particular one of said plurality of base stations;

each particular base station having a particular one of said radio service zones in which each one of said mobile radio terminals currently exists;

each of said mobile radio terminals also comprising:
means for receiving a downlink signal transmitted from said particular base station; and
means for measuring and transmitting to said particular base station downlink signal quality data relating to quality of the downlink signal during a predetermined time interval;

each of said base stations also comprising:
means for receiving an uplink signal transmitted from said particular mobile station; and
means for measuring uplink signal quality data relating to quality of the uplink signal during said predetermined time interval;

said particular base station sending said downlink signal quality data and said uplink signal quality data to said base station control device;

said base station control device also comprising:
means for determining communication quality within said particular radio service zone from said downlink signal quality data and said uplink signal quality data; and
for sending an access confinement signal to said particular base station when said communication quality is determined to be bad;

whereby said particular base station responds to said access confinement signal by processing new calls, to and from one of said mobile radio terminals and said particular base station, as busy.

10. The code division multi-access communication system as claimed in claim 9, wherein said base station control device further transmits said access confinement signal to specific base stations which have radio service zones adjacent to said particular radio service zone; and each of said specific base stations responds to said access confinement signal by processing new calls to and from one of said mobile radio terminals and said specific base station as busy.

11. The code division multi-access communication system as claimed in claim 9, further comprising:

n said base stations, which handle;

m said calls;

wherein said means for measuring uplink signal quality data includes m channel control portions which correspond to each of said m calls handled by each of said n base stations; and said means for determining communication quality within said particular radio service zone includes n statistical processing portions which correspond to each of n base stations.

* * * * *